US012307963B2

(12) United States Patent
Wang

(10) Patent No.: US 12,307,963 B2
(45) Date of Patent: May 20, 2025

(54) PIXEL CIRCUIT, PIXEL DRIVING METHOD AND DISPLAY APPARATUS

(71) Applicant: BOE Technology Group Co., Ltd., Beijing (CN)

(72) Inventor: Li Wang, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 17/913,790

(22) PCT Filed: Nov. 8, 2021

(86) PCT No.: PCT/CN2021/129328
§ 371 (c)(1),
(2) Date: Sep. 22, 2022

(87) PCT Pub. No.: WO2022/217903
PCT Pub. Date: Oct. 20, 2022

(65) Prior Publication Data
US 2024/0212604 A1 Jun. 27, 2024

(30) Foreign Application Priority Data
Apr. 14, 2021 (CN) ........................ 202110400417.7

(51) Int. Cl.
*G09G 3/3233* (2016.01)

(52) U.S. Cl.
CPC ... *G09G 3/3233* (2013.01); *G09G 2300/0819* (2013.01); *G09G 2300/0842* (2013.01);
(Continued)

(58) Field of Classification Search
None
See application file for complete search history.

(56) References Cited

U.S. PATENT DOCUMENTS

2003/0062524 A1 4/2003 Kimura
2006/0097965 A1 5/2006 Deane et al.
(Continued)

FOREIGN PATENT DOCUMENTS

CN 1407629 A 4/2003
CN 1742308 A 3/2006
(Continued)

OTHER PUBLICATIONS

CN108538245; Liu Lu; A Display panel, driving method thereof and display device; 2018.*
(Continued)

*Primary Examiner* — Amr A Awad
*Assistant Examiner* — Donna V Bocar
(74) *Attorney, Agent, or Firm* — IPro, PLLC

(57) ABSTRACT

A pixel circuit, pixel driving method and display apparatus are provided. The pixel circuit includes an energy storage circuit, a first initialization circuit, a data writing circuit, a compensation circuit, a light emitting element and N driving branches, N being an integer greater than 1; first and second terminals of the energy storage circuit are electrically connected to a driving node and a first voltage terminal, respectively; the first initialization circuit is electrically connected to a reset control terminal, an initial voltage terminal and the driving node, to write an initial voltage to the driving node under control of a reset control signal; the compensation circuit is electrically connected to a scanning control terminal, the driving node and a specific second node of N second nodes, to establish a connection between the driving node and the specific second node under control of a scanning control signal.

11 Claims, 3 Drawing Sheets

(52) U.S. Cl.
CPC ............... *G09G 2300/0861* (2013.01); *G09G 2310/061* (2013.01); *G09G 2320/0233* (2013.01)

(56) References Cited

U.S. PATENT DOCUMENTS

| | | | | |
|---|---|---|---|---|
| 2006/0145968 | A1 | 7/2006 | You et al. | |
| 2007/0164938 | A1 | 7/2007 | Shin et al. | |
| 2010/0302285 | A1 | 12/2010 | Yamanaka | |
| 2015/0379928 | A1 | 12/2015 | Zhang | |
| 2018/0025690 | A1 | 1/2018 | Bao et al. | |
| 2019/0392765 | A1 | 12/2019 | Kuk et al. | |
| 2020/0410926 | A1* | 12/2020 | Li | G09G 3/325 |
| 2021/0012709 | A1 | 1/2021 | Qian et al. | |
| 2021/0056900 | A1* | 2/2021 | Kuo | G09G 3/3233 |
| 2021/0151540 | A1 | 5/2021 | Wang | |
| 2021/0327345 | A1 | 10/2021 | Chen | |

FOREIGN PATENT DOCUMENTS

| | | | |
|---|---|---|---|
| CN | 1797525 | A | 7/2006 |
| CN | 201177956 | Y | 1/2009 |
| CN | 101903934 | A | 12/2010 |
| CN | 103489404 | A | 1/2014 |
| CN | 104599634 | A | 5/2015 |
| CN | 105609047 | A | 5/2016 |
| CN | 107731163 | A | 2/2018 |
| CN | 108538245 | A | 9/2018 |
| CN | 109410836 | A | 3/2019 |
| CN | 109659350 | A | 4/2019 |
| CN | 110114885 | A | 8/2019 |
| CN | 110634446 | A | 12/2019 |
| CN | 112233621 | A | 1/2021 |
| CN | 113112964 | A | 7/2021 |

OTHER PUBLICATIONS

CN 202110400417.7 first office action.

PCT/CN2021/129328 international search report and written opinion.

* cited by examiner

PIXEL CIRCUIT, PIXEL DRIVING METHOD AND DISPLAY APPARATUS

CROSS-REFERENCE TO RELATED APPLICATION

This application is the U.S. national phase of PCT Application No. PCT/CN2021/129328 filed on Nov. 8, 2021, which claims a priority to the Chinese patent application No. 202110400417.7 filed in China on Apr. 14, 2021, the disclosures of which are incorporated herein by reference in their entireties.

TECHNICAL FIELD

The present disclosure relates to the field of display technology, in particular to a pixel circuit, a pixel driving method and a display apparatus.

BACKGROUND

In the related art, organic light emitting diode (OLED) display products with low pixels per inch (PPI, the number of pixels per inch) and low aperture ratio require extremely large light emitting current (the magnitude of the light emitting current is of the order of microamperes (uA)) of sub-pixels to maintain the same luminance. The required light emitting current is 50-100 times the light emitting current of conventional sub-pixels, thus, a plurality of pixel driving circuits are needed to drive a single light emitting element to emit light, so as to increase the light emitting current of the light emitting element. The existing pixel circuits that provide high light emitting currents adopt a large number of transistors, which is not conducive to saving layout space.

SUMMARY

In a first aspect, a pixel circuit is provided according to an embodiment of the present disclosure, the pixel circuit includes:

an energy storage circuit, a first initialization circuit, a data writing circuit, a compensation circuit, a light emitting element and N driving branches, wherein N is an integer greater than 1, and the N driving branches include N first nodes and N second nodes;

a first terminal of the energy storage circuit is electrically connected to a driving node, a second terminal of the energy storage circuit is electrically connected to a first voltage terminal, and the energy storage circuit is used for storing electric energy;

the first initialization circuit is electrically connected to a reset control terminal, an initial voltage terminal and the driving node, and is used for writing the initial voltage provided by the initial voltage terminal into the driving node under control of the reset control signal provided by the reset control terminal;

the $n^{th}$ driving branch includes the $n^{th}$ driving sub-circuit and the $n^{th}$ light emitting control sub-circuit, n being a positive integer less than or equal to N;

the $n^{th}$ driving sub-circuit is electrically connected to the driving node, the $n^{th}$ first node and the $n^{th}$ second node, and is used for generating, under control of an electric potential of the driving node, the $n^{th}$ driving current flowing from the $n^{th}$ first node to the $n^{th}$ second node;

the $n^{th}$ light emitting control sub-circuit is electrically connected to a light emitting control terminal, the first voltage terminal, the $n^{th}$ first node, the $n^{th}$ second node and the light emitting element, and is used for establishing, under control of a light emitting control signal provided by the light emitting control terminal, a connection between the first voltage terminal and the $n^{th}$ first node, and a connection between the $n^{th}$ second node and the light emitting element;

the compensation circuit is electrically connected to a scanning control terminal, the driving node and a specific second node of the N second nodes, and is used for establishing a connection between the driving node and the specific second node under control of the scanning control signal; and the data writing circuit is electrically connected to a data line, the scanning control terminal and the $n^{th}$ first node, and is used for writing the data voltage on the data line into the $n^{th}$ first node under control of the scanning control signal provided by the scanning control terminal.

Optionally, the pixel circuit according to at least one embodiment of the present disclosure further includes a second initialization circuit:

the second initialization circuit is electrically connected to the scanning control terminal, the initial voltage terminal and the first electrode of the light emitting element, and is used for writing the initial voltage into the first electrode of the light emitting element under control of the scanning control signal; and the second electrode of the light emitting element is electrically connected to a second voltage terminal.

Optionally, the data writing circuit includes N data writing sub-circuits; and the $n^{th}$ data writing sub-circuit is electrically connected to the scanning control terminal, the $n^{th}$ data line and the $n^{th}$ first node, and is used for writing the $n^{th}$ data voltage on the $n^{th}$ data line into the $n^{th}$ first node under control of the scanning control signal.

Optionally, the $n^{th}$ data writing sub-circuit includes the $n^{th}$ third transistor; and the control electrode of the $n^{th}$ third transistor is electrically connected to the scanning control terminal, the first electrode of the $n^{th}$ third transistor is electrically connected to the $n^{th}$ data line, and the second electrode of the $n^{th}$ third transistor is electrically connected to the $n^{th}$ first node.

Optionally, the second initialization circuit includes a first transistor; and the control electrode of the first transistor is electrically connected to the scanning control terminal, the first electrode of the first transistor is electrically connected to the initial voltage terminal, and the second electrode of the first transistor is electrically connected to the first electrode of the light emitting element.

Optionally, the compensation circuit includes a second transistor; and the control electrode of the second transistor is electrically connected to the scanning control terminal, the first electrode of the second transistor is electrically connected to the driving node, and the second electrode of the second transistor is electrically connected to the specific second node.

Optionally, the data writing circuit is used for writing, under control of the scanning control signal provided by the scanning control terminal, the data voltage on the same data line into all the first nodes.

Optionally, the compensation circuit is further electrically connected to at least one second node of the N second nodes other than the specific second node, and is further used for establishing a connection between the driving node and the at least one second node under control of the scanning control signal.

Optionally, the energy storage circuit includes a storage capacitor, the first initialization circuit includes a fourth transistor, the $n^{th}$ driving sub-circuit includes the $n^{th}$ drive transistor, and the $n^{th}$ light emitting control sub-circuit includes the $n^{th}$ fifth transistor and the $n^{th}$ sixth transistor:

- the first terminal of the storage capacitor is electrically connected to the driving node, and the second terminal of the storage capacitor is electrically connected to the first voltage terminal;
- the control electrode of the fourth transistor is electrically connected to the reset control terminal, the first electrode of the fourth transistor is electrically connected to the initial voltage terminal, and the second electrode of the fourth transistor is electrically connected to the driving node;
- the control electrode of the $n^{th}$ drive transistor is electrically connected to the driving node, the first electrode of the $n^{th}$ drive transistor is electrically connected to the $n^{th}$ first node, and the second electrode of the $n^{th}$ drive transistor is electrically connected to the $n^{th}$ second node;
- the control electrode of the $n^{th}$ fifth transistor is electrically connected to the light emitting control terminal, the first electrode of the $n^{th}$ fifth transistor is electrically connected to the first voltage terminal, and the second electrode of the $n^{th}$ fifth transistor is electrically connected to the $n^{th}$ first node; and
- the control electrode of the $n^{th}$ sixth transistor is electrically connected to the light emitting control terminal, the first electrode of the $n^{th}$ sixth transistor is electrically connected to the $n^{th}$ second node, and the second electrode of the $n^{th}$ sixth transistor is electrically connected to the light emitting element.

In a second aspect, a pixel driving method is provided according to an embodiment of the present disclosure, the pixel driving method is applied to the above pixel circuit, a driving cycle including an initialization phase, a data writing phase and a light emitting phase which are arranged in sequence: and the pixel driving method includes:

- in the initialization stage, a first initialization circuit writes an initial voltage into a driving node under control of a reset control signal;
- in the data writing stage, a data writing circuit writes a data voltage into the $n^{th}$ first node under control of a scanning control signal, and a compensation circuit establishes a connection between the driving node and a specific second node under control of the scanning control signal; and
- in the light-emitting stage, the $n^{th}$ light emitting control sub-circuit establishes, under control of a light emitting control signal, a connection between a first voltage terminal and the $n^{th}$ first node, and a connection between the $n^{th}$ second node and a light emitting element, and the $n^{th}$ driving sub-circuit generates, under control of the electric potential of the driving node, the $n^{th}$ driving current flowing from the $n^{th}$ first node to the $n^{th}$ second node.

Optionally, the pixel circuit further includes a second initialization circuit; and

- the pixel driving method further includes: in the data writing phase, the second initialization circuit writes, under control of the scanning control signal, the initial voltage into a first electrode of the light emitting element.

In a third aspect, a display apparatus including the above pixel circuit is provided according to an embodiment of the present disclosure.

DETAILED DESCRIPTION

Figure 1:
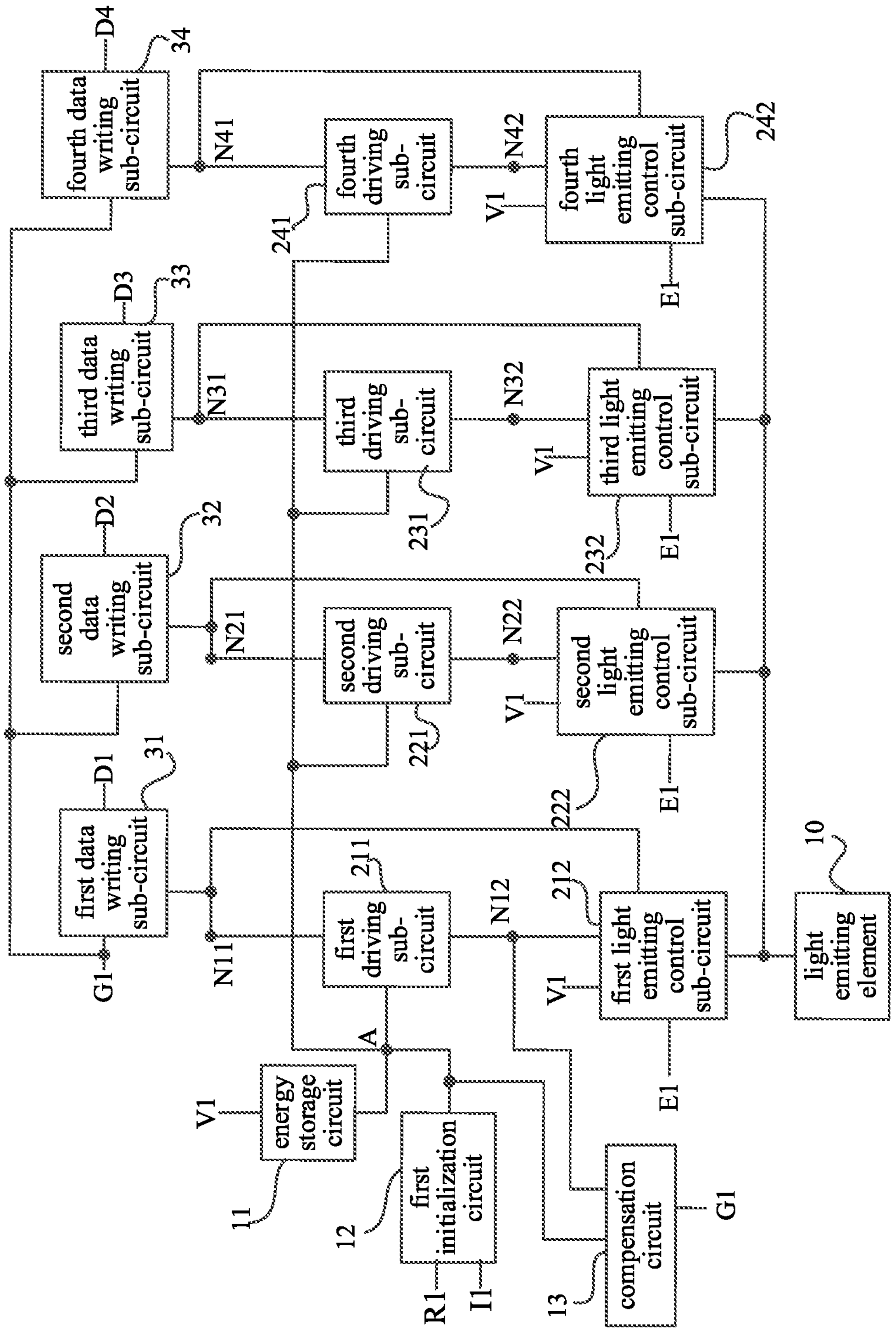
FIG. 1 is a structural view of a pixel circuit according to at least one embodiment of the present disclosure.

The technical solutions of embodiments of the present disclosure will be described hereinafter in a clear and complete manner in conjunction with the drawings of the embodiments. Obviously, the following embodiments merely relate to a part of, rather than all of, the embodiments of the present disclosure, and based on these embodiments, a person skilled in the art may, without any creative effort, obtain the other embodiments, which also fall within the scope of the present disclosure.

The transistors used in all embodiments of the present disclosure can be triodes, thin film transistors or field effect transistors or other devices with the same characteristics. In the embodiments of the present disclosure, to distinguish between two electrodes of a transistor other than a control electrode, one of the two electrodes is referred to as a first electrode, and the other electrode is referred to as a second electrode.

In practice, when the transistor is a triode, the control electrode can be a base electrode, the first electrode can be a collector electrode, and the second electrode can be an emitter electrode; alternatively, the control electrode can be a base electrode, the first electrode can be an emitter electrode, and the second electrode can be a collector electrode.

In practice, when the transistor is a thin film transistor or a field effect transistor, the control electrode can be a gate electrode, the first electrode can be a drain electrode, and the second electrode can be a source electrode: alternatively, the control electrode can be a gate electrode, the first electrode can be a source electrode, and the second electrode can be a drain electrode.

The pixel circuit according to the embodiments of the present disclosure includes an energy storage circuit, a first initialization circuit, a data writing circuit, a compensation circuit, a light emitting element and N driving branches, where N is an integer greater than 1, and the N driving branches include N first nodes and N second nodes.

A first terminal of the energy storage circuit is electrically connected to a driving node, a second terminal of the energy storage circuit is electrically connected to a first voltage terminal, and the energy storage circuit is used for storing electric energy.

The first initialization circuit is electrically connected to a reset control terminal, an initial voltage terminal and the driving node, and is used for writing, under control of the reset control signal provided by the reset control terminal, the initial voltage provided by the initial voltage terminal into the driving node.

The $n^{th}$ driving branch includes the $n^{th}$ driving sub-circuit and the $n^{th}$ light emitting control sub-circuit: n is a positive integer less than or equal to N.

The $n^{th}$ driving sub-circuit is electrically connected to the driving node, the $n^{th}$ first node and the $n^{th}$ second node, and is used for generating, under control of the electric potential of the driving node, the $n^{th}$ driving current flowing from the $n^{th}$ first node to the $n^{th}$ second node of the second nodes:

The $n^{th}$ light emitting control sub-circuit is electrically connected to a light emitting control terminal, the first voltage terminal, the $n^{th}$ first node, the $n^{th}$ second node and the light emitting element, respectively, and is used for establishing, under control of a light emitting control signal provided by the light emitting control terminal, a connection between the first voltage terminal and the $n^{th}$ first node, and a connection between the $n^{th}$ second node and the light emitting element.

The compensation circuit is electrically connected to a scanning control terminal, the driving node and a specific second node of the N second nodes, and is used for establishing a connection between the driving node and the specific second node under control of the scanning control signal.

The data writing circuit is electrically connected to a data line, the scanning control terminal and the $n^{th}$ first node, and is used for writing the data voltage on the data line into the $n^{th}$ first node under control of the scanning control signal provided by the scanning control terminal.

The pixel circuit according to the embodiments of the present disclosure shares the energy storage circuit and the first initialization circuit, so that the quantity of transistors used can be reduced and the layout space can be saved on the premise of increasing the light emitting current of the light emitting element.

Furthermore, in the pixel circuit according to at least one embodiment of the present disclosure, the compensation circuit can include only one compensation transistor, so as to further reduce the quantity of used transistors, and to compensate the threshold voltage of the drive transistor included in a driving sub-circuit during the data writing phase, such that the data voltages provided by the data writing circuit to various first nodes can be equal or approximately equal (but the present disclosure is not limited thereto) during the data writing phase. In the layout design, positions of the drive transistors included in various driving sub-circuits are relatively concentrated, thus the TFT device process fluctuation is relatively small, and the difference between the threshold voltages of different drive transistors can be ignored; furthermore, a plurality of driving branches are connected in parallel, and the impact of the threshold voltage difference between the drive transistors can be partially neutralized.

In at least one embodiment of the present disclosure, the specific second node can refer to: one second node selected from the N second nodes.

In at least one embodiment of the present disclosure, the light emitting element can be, but is not limited to, an organic light emitting diode.

In at least one embodiment of the present disclosure, the first voltage terminal can be, but is not limited to, a high voltage terminal.

In the related art, organic light emitting diode (OLED) display products with low PPI and low aperture ratio require extremely large light emitting current (the magnitude of the light emitting current is of the order of microamperes) of sub-pixels to maintain the same luminance. The required light emitting current is 50-100 times the light emitting current of conventional sub-pixels, thus, a plurality of pixel driving circuits are needed to drive a single light emitting element to emit light, so as to increase the light emitting current of the light emitting element. The pixel circuit according to the embodiments of the present disclosure uses N driving branches to drive the light emitting element to emit light, and shares both the energy storage circuit and the first initialization circuit, so that the quantity of transistors used can be reduced while ensuring the light emitting current.

Optionally, the data writing circuit includes N data writing sub-circuits; and the $n^{th}$ data writing sub-circuit is electrically connected to the scanning control terminal, the $n^{th}$ data line and the $n^{th}$ first node, and is used for writing the $n^{th}$ data voltage on the $n^{th}$ data line into the $n^{th}$ first node under control of the scanning control signal.

In at least one embodiment of the present disclosure, the data writing circuit can include N data writing sub-circuits, and each data writing sub-circuit can be electrically connected to a corresponding data line and a corresponding first node to provide corresponding data voltage for respective driving sub-circuit, and different data lines can be connected to data channels of different respective data drivers, thus eliminating the problem of insufficient driving.

As shown in FIG. 1, the pixel circuit according to at least one embodiment of the present disclosure includes an energy storage circuit 11, a first initialization circuit 12, a data writing circuit, a light emitting element 10, a compensation circuit 13, a first driving branch, a second driving branch, a third driving branch and a fourth driving branch.

The data writing circuit includes a first data writing sub-circuit 31, a second data writing sub-circuit 32, a third data writing sub-circuit 33 and a fourth data writing sub-circuit 34.

A first terminal of the energy storage circuit 11 is electrically connected to a driving node A, a second terminal of the energy storage circuit 11 is electrically connected to a first voltage terminal V1, and the energy storage circuit 11 is used for storing electric energy.

The first initialization circuit 12 is electrically connected to a reset control terminal R1, an initial voltage terminal I1 and the driving node A, and is used for writing an initial voltage Vi provided by the initial voltage terminal I1 into the driving node A under control of a reset control signal provided by the reset control terminal R1.

The first driving branch includes a first driving sub-circuit 211 and a first light emitting control sub-circuit 212.

The first driving sub-circuit 211 is electrically connected to the driving node A, the $1^{st}$ first node N11 and the $1^{st}$ second node N12, and is used for generating, under control of the electric potential of the driving node A, a first driving current flowing from the $1^{st}$ first node N11 to the $1^{st}$ second node N12.

The first light emitting control sub-circuit 212 is electrically connected to a light emitting control terminal E1, the first voltage terminal V1, the $1^{st}$ first node N11, the $1^{st}$ second node N12 and the light emitting element 10, and is used for establishing a connection between the first voltage terminal V1 and the $1^{st}$ first node N11 and a connection between the $1^{st}$ second node N12 and the light emitting element 10 under control of a light emitting control signal provided by the light emitting control terminal E1.

The first data writing sub-circuit 31 is electrically connected to a scanning control terminal G1, a first data line D1 and the $1^{st}$ first node N11, and is used for writing a first data voltage on the first data line D1 into the $1^{st}$ first node N11 under control of a scanning control signal provided by G1.

The second driving branch includes a second driving sub-circuit 221 and a second light emitting control sub-circuit 222.

The second driving sub-circuit 221 is electrically connected to the driving node A, the $2^{nd}$ first node N21 and the $2^{nd}$ second node N22, and is used for generating, under control of the electric potential of the driving node A, a second driving current flowing from the $2^{nd}$ first node N21 to the $2^{nd}$ second node N22.

The second light emitting control sub-circuit 222 is electrically connected to the light emitting control terminal E1, the first voltage terminal V1, the $2^{nd}$ first node N21, the $2^{nd}$ second node N22 and the light emitting element 10, and is used for establishing a connection between the first voltage terminal V1 and the $2^{nd}$ first node N21 and a connection between the $2^{nd}$ second node N22 and the light emitting element 10 under control of a light emitting control signal provided by the light emitting control terminal E1.

The second data writing sub-circuit 32 is electrically connected to the scanning control terminal G1, a second data line D2 and the $2^{nd}$ first node N21, and is used for writing a second data voltage on the second data line D2 into the $2^{nd}$ first node N21 under control of a scanning control signal provided by G1.

The third driving branch includes a third driving sub-circuit 231 and a third light emitting control sub-circuit 232.

The third driving sub-circuit 231 is electrically connected to the driving node A, the $3^{rd}$ first node N31 and the $3^{rd}$ second node N32, and is used for generating, under control of the electric potential of the driving node A, a third driving current flowing from the $3^{rd}$ first node N31 to the $3^{rd}$ second node N32.

The third light emitting control sub-circuit 232 is electrically connected to the light emitting control terminal E1, the first voltage terminal V1, the $3^{rd}$ first node N31, the $3^{rd}$ second node N32 and the light emitting element 10, and is used for establishing a connection between the first voltage terminal V1 and the $3^{rd}$ first node N31 and a connection between the $3^{rd}$ second node N32 and the light emitting element 10 under control of a light emitting control signal provided by the light emitting control terminal E1.

The third data writing sub-circuit 33 is electrically connected to the scanning control terminal G1, a third data line D3 and the $3^{rd}$ first node N31, and is used for writing a third data voltage on the third data line D3 into the $3^{rd}$ first node N31 under control of a scanning control signal provided by G1.

The fourth driving branch includes a fourth driving sub-circuit 241 and a fourth light emitting control sub-circuit 242.

The fourth driving sub-circuit 241 is electrically connected to the driving node A, the $4^{th}$ first node N41 and the $4^{th}$ second node N42, and is used for generating, under control of the electric potential of the driving node A, a fourth driving current flowing from the $4^{th}$ first node N41 to the $4^{th}$ second node N42.

The fourth light emitting control sub-circuit 242 is electrically connected to the light emitting control terminal E1, the first voltage terminal V1, the $4^{th}$ first node N41, the $4^{th}$ second node N42 and the light emitting element 10, and is used for establishing a connection between the first voltage terminal V1 and the $4^{th}$ first node N41 and a connection between the $4^{th}$ second node N42 and the light emitting element 10 under control of a light emitting control signal provided by the light emitting control terminal E1.

The fourth data writing sub-circuit 34 is electrically connected to the scanning control terminal G1, a fourth data line D4 and the $4^{th}$ first node N41, and is used for writing a fourth data voltage on the fourth data line D4 into the $4^{th}$ first node N41 under control of a scanning control signal provided by G1.

The compensation circuit 13 is electrically connected to the scanning control terminal G1, the driving node A and the $1^{st}$ second node N12, and is used for establishing a connection between the driving node A and the $1^{st}$ second node N12 under control of the scanning control signal.

In at least one embodiment of the pixel circuit as shown in FIG. 1, the specific second node is the $1^{st}$ second node N12, and the energy storage circuit 11, the first initialization circuit 12, the first data writing sub-circuit 31, the compensation circuit 13 and the first driving branch 21 constitute a basic pixel driving circuit.

During operation of at least one embodiment of the pixel circuit as shown in FIG. 1 of the present disclosure, a driving cycle can include an initialization phase, a data writing phase and a light emitting phase which are arranged in sequence.

In the initialization phase, the first initialization circuit 12 writes the initial voltage Vi provided by the initial voltage terminal I1 into the driving node A under control of a reset control signal provided by the reset control terminal R1, so as to initialize the electric potential of the driving node A, so that at the beginning of the data writing phase, the first driving sub-circuit 211 can establish an electrical connection between N11 and N12 under control of the electric potential of the driving node A.

In the data writing stage, the compensation circuit 13, under control of the scanning control signal, establishes a connection between the driving node A and the $1^{st}$ second node N12: the first data writing sub-circuit 31, under control of the scanning control signal provided by G1, writes the first data voltage on the first data line D1 into the $1^{st}$ first node N11: the second data writing sub-circuit 32, under control of the scanning control signal provided by G1, writes the second data voltage on the second data line D2 into the $2^{nd}$ first node N21: the third data writing sub-circuit 33, under control of the scanning control signal provided by G1, writes the third data voltage on the third data line D3 into the $3^{rd}$ first node N31: The fourth data writing sub-circuit 34, under control of the scanning control signal provided by G1, writes the fourth data voltage on the fourth data line D4 into the $4^{th}$ first node N41; wherein the first data voltage, the second data voltage, the third data voltage and the fourth data voltage can be equal.

At the beginning of the data writing phase, the first driving sub-circuit 211 can establish a connection between N11 and N12 under control of the electric potential of the driving node A to charge the energy storage circuit 11 via a first data voltage Vd1, so as to raise the electric potential of the driving node A until the electric potential of the driving node A becomes Vd1+Vth, and then the first driving sub-circuit 211 disconnects N11 from N12: wherein Vth is a threshold voltage of the drive transistor included in the first driving sub-circuit 211.

In the light emitting phase, the first light emitting control sub-circuit 212, under control of the light emitting control signal provided by the light emitting control terminal E1, establishes a connection between the first voltage terminal V1 and the $1^{st}$ first node N11 and a connection between the $1^{st}$ second node N12 and the light emitting element 10; the second light emitting control sub-circuit 222, under control of the light emitting control signal provided by the light emitting control terminal E1, establishes a connection between the first voltage terminal V1 and the $2^{nd}$ first node N21 and a connection between the $2^{nd}$ second node N22 and the light emitting element 10: the third light emitting control sub-circuit 232, under control of the light emitting control signal provided by the light emitting control terminal E1, establishes a connection between the first voltage terminal V1 and the $3^{rd}$ first node N31 and a connection between the $3^{rd}$ second node N32 and the light emitting element 10; the fourth light emitting control sub-circuit 242, under control of the light emitting control signal provided by the light emitting control terminal E1, establishes a connection between the first voltage terminal V1 and the $4^{th}$ first node N41 and a connection between the $4^{th}$ second node N42 and the light emitting element 10: the first driving sub-circuit 211, under control of the electric potential of the driving node A, generates the first driving current flowing from the $1^{st}$ first node N11 to the $1^{st}$ second node N12; the second driving sub-circuit 221, under control of the electric potential of the driving node A, generates a second driving current flowing from the $2^{nd}$ first node N21 to the $2^{nd}$ second node N22: the third driving sub-circuit 231, under control of the electric potential of the driving node A, generates the third driving current flowing from the $3^{rd}$ first node N31 to the $3^{rd}$ second node N32; the fourth driving sub-circuit 241, under control of the electric potential of the driving node A, generates the fourth driving current flowing from the $4^{th}$ first node N41 to the $4^{th}$ second node N42.

In the light emitting phase, the light emitting current flowing through the light emitting element 10 is the sum of the first driving current, the second driving current, the third driving current and the fourth driving current.

The at least one embodiment shown in FIG. 1 is described by taking N being equal to 4 as an example: in practice, N can be a larger positive integer. For example, if a light emitting current of 10 uA is required, N can be not less than 20 and not greater than 25, but the present disclosure is not limited thereto.

Optionally, the pixel circuit according to at least one embodiment of the present disclosure can further include a second initialization circuit.

The second initialization circuit is electrically connected to the scanning control terminal, the initial voltage terminal and the first electrode of the light emitting element, and is used for writing the initial voltage into the first electrode of the light emitting element under control of the scanning control signal.

The second electrode of the light emitting element is electrically connected to a second voltage terminal.

In at least one embodiment of the present disclosure, the pixel circuit can further include a second initialization circuit, which can write, during the data writing phase, an initial voltage to the first electrode of the light emitting element under control of the scanning control signal to eliminate the residual charges on the first electrode of the light emitting element.

In a specific implementation, the pixel circuit according to at least one embodiment of the present disclosure can share the second initialization circuit, and the second initialization circuit can merely include one transistor for initializing the first electrode of the light-emitting element, so as to reduce the quantity of used transistors, simplify the circuit and save the layout space.

When the light emitting element is an organic light emitting diode, the first electrode of the light emitting element can be an anode, and the second electrode of the light emitting element can be a cathode: the second voltage terminal can be a low voltage terminal or a ground terminal.

Figure 2:
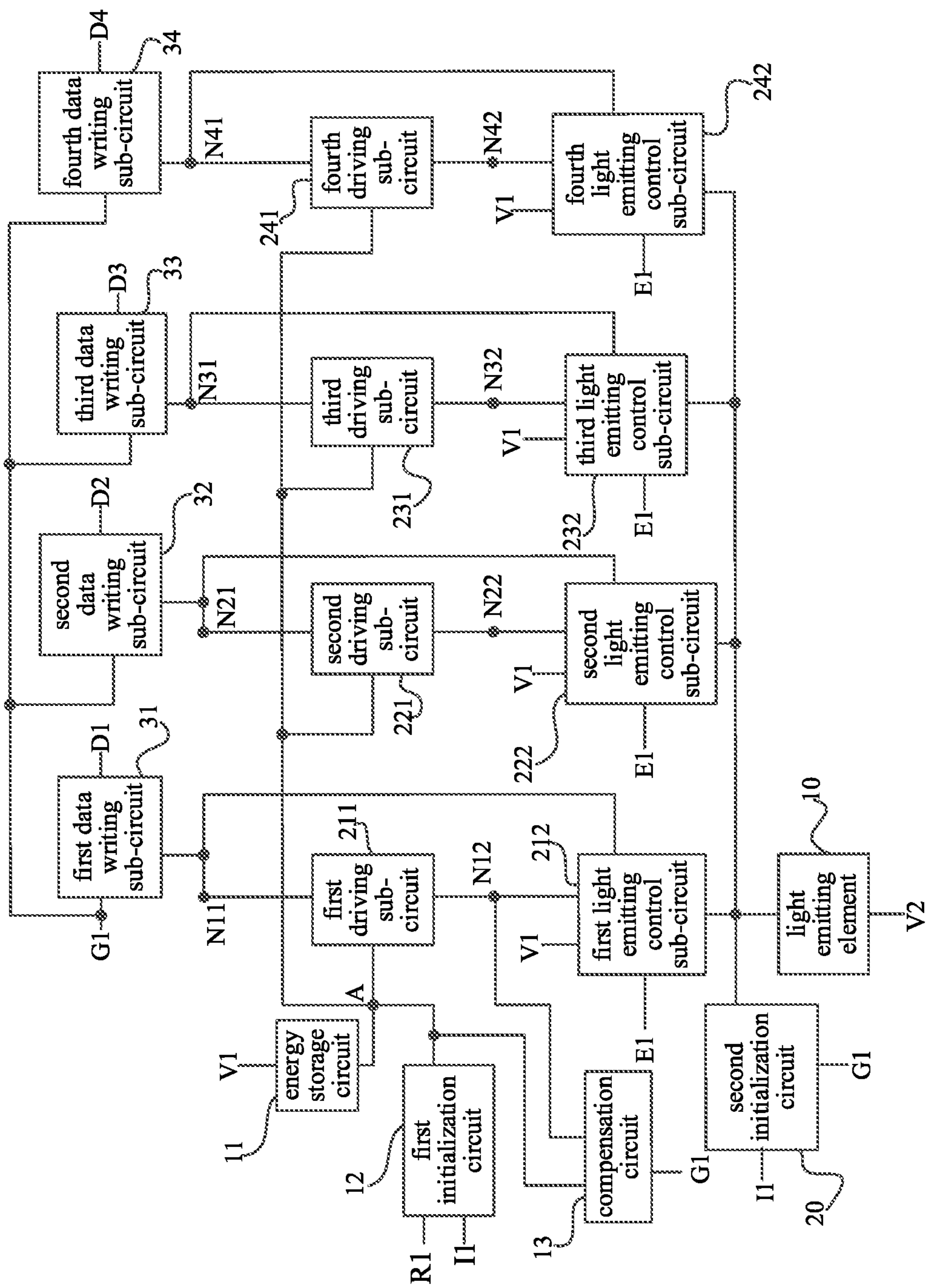
FIG. 2 is a structural view of a pixel circuit according to at least one embodiment of the present disclosure.

As shown in FIG. 2, based on at least one embodiment of the pixel circuit shown in FIG. 1, the pixel circuit further includes a second initialization circuit 20.

The second initialization circuit 20 is electrically connected to the scanning control terminal G1, the initial voltage terminal I1 and the first electrode of the light-emitting element 10, and is used for writing the initial voltage Vi into the first electrode of the light-emitting element 10 under control of the scanning control signal.

The second electrode of the light emitting element 10 is electrically connected to a second voltage terminal V2.

During operation of at least one embodiment of the pixel circuit as shown in FIG. 2, in the data writing phase, the second initialization circuit 20 controls to write the initial voltage Vi into the first electrode of the light emitting element 10 to eliminate the residual charges on the first electrode of the light emitting element 10, and controls the light emitting element 10 not to emit light.

Optionally, the $n^{th}$ data writing sub-circuit can include the $n^{th}$ third transistor.

The control electrode of the $n^{th}$ third transistor is electrically connected to the scanning control terminal, the first electrode of the $n^{th}$ third transistor is electrically connected to the $n^{th}$ data line, and the second electrode of the $n^{th}$ third transistor is electrically connected to the $n^{th}$ first node. Optionally, the second initialization circuit can include a first transistor.

The control electrode of the first transistor is electrically connected to the scanning control terminal, the first electrode of the first transistor is electrically connected to the initial voltage terminal, and the second electrode of the first transistor is electrically connected to the first electrode of the light emitting element. Optionally, the compensation circuit includes a second transistor.

The control electrode of the second transistor is electrically connected to the scanning control terminal, the first electrode of the second transistor is electrically connected to the driving node, and the second electrode of the second transistor is electrically connected to the specific second node.

Optionally, the energy storage circuit includes a storage capacitor, the first initialization circuit includes a fourth transistor, the $n^{th}$ driving sub-circuit includes the $n^{th}$ drive transistor, and the $n^{th}$ light emitting control sub-circuit includes the $n^{th}$ fifth transistor and the $n^{th}$ sixth transistor.

The first terminal of the storage capacitor is electrically connected to the driving node, and the second terminal of the storage capacitor is electrically connected to the first voltage terminal.

The control electrode of the fourth transistor is electrically connected to the reset control terminal, the first electrode of the fourth transistor is electrically connected to the initial voltage terminal, and the second electrode of the fourth transistor is electrically connected to the driving node.

The control electrode of the $n^{th}$ drive transistor is electrically connected to the driving node, the first electrode of the $n^{th}$ drive transistor is electrically connected to the $n^{th}$ first node, and the second electrode of the $n^{th}$ drive transistor is electrically connected to the $n^{th}$ second node.

The control electrode of the $n^{th}$ fifth transistor is electrically connected to the light emitting control terminal, the first electrode of the $n^{th}$ fifth transistor is electrically connected to the first voltage terminal, and the second electrode of the $n^{th}$ fifth transistor is electrically connected to the $n^{th}$ first node.

The control electrode of the $n^{th}$ sixth transistor is electrically connected to the light emitting control terminal, the first electrode of the $n^{th}$ sixth transistor is electrically connected to the $n^{th}$ second node, and the second electrode of the $n^{th}$ sixth transistor is electrically connected to the light emitting element.

Figure 3:
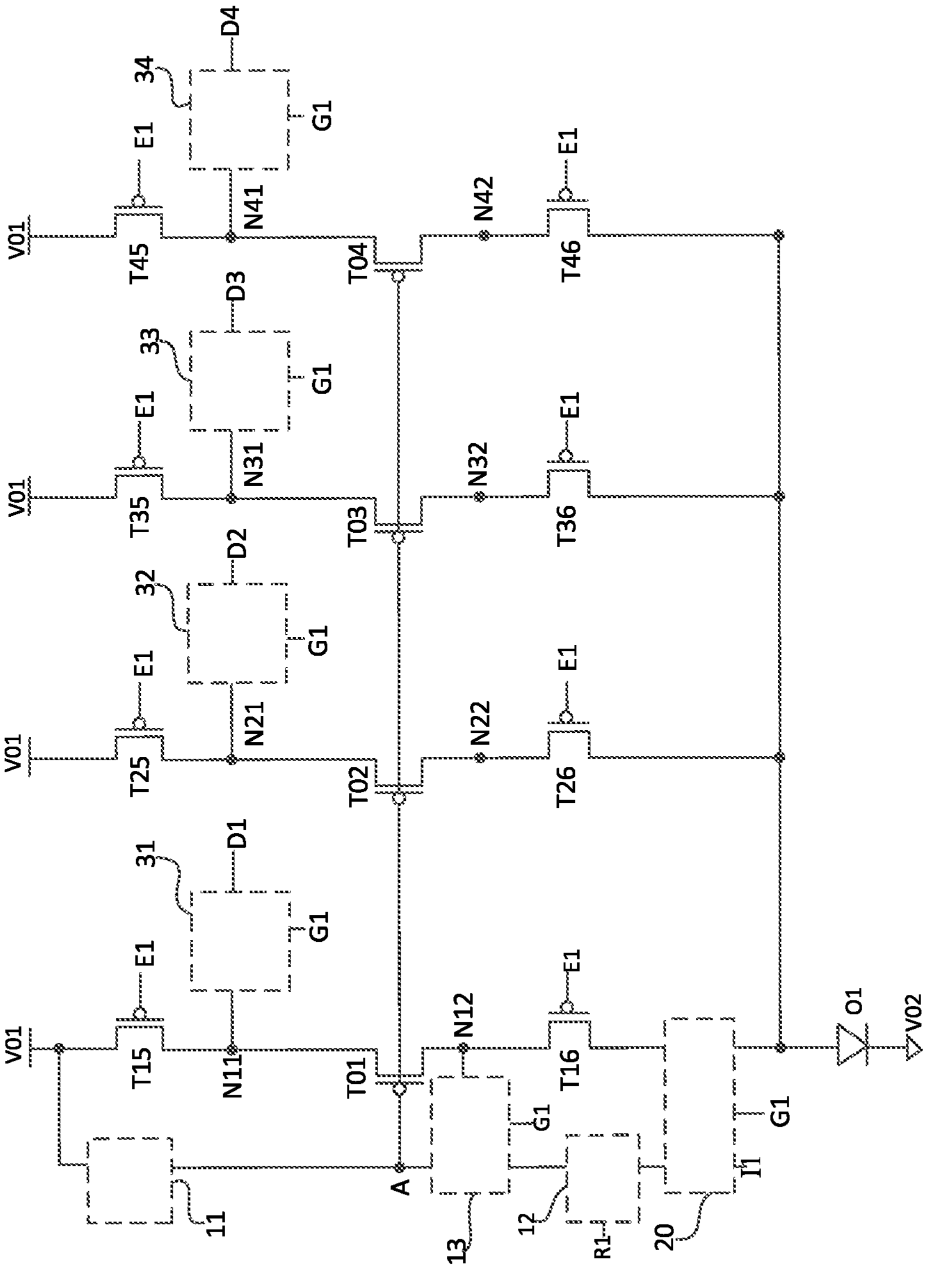
FIG. 3 is a circuit diagram of a pixel circuit according to at least one embodiment of the present disclosure.

As shown in FIG. 3, on the basis of the embodiment of the pixel circuit shown in FIG. 2, the energy storage circuit 11 includes a storage capacitor C1, the first initialization circuit 12 includes a fourth transistor T4, and the compensation circuit 13 includes a second transistor T2; the second initialization circuit 20 includes a first transistor T1: the light emitting element is an organic light-emitting diode O1.

The gate electrode of the first transistor T1 is electrically connected to the scanning control terminal G1, the source electrode of the first transistor T1 is electrically connected to the initial voltage terminal I1, and the drain electrode of the first transistor T1 is electrically connected to the anode of the organic light-emitting diode O1.

The gate electrode of the second transistor T2 is electrically connected to the scanning control terminal G1, the source electrode of the second transistor T2 is electrically connected to the driving node A, and the drain electrode of the second transistor T2 is electrically connected to the $1^{st}$ second node N12.

The first terminal of the storage capacitor C1 is electrically connected to the driving node A, and the second terminal of the storage capacitor C1 is electrically connected to the high voltage terminal: the high voltage terminal is used for providing a high voltage signal V01.

The gate electrode of the fourth transistor T4 is electrically connected to the reset control terminal R1, the source electrode of the fourth transistor T4 is electrically connected to the initial voltage terminal I1, and the drain electrode of the fourth transistor T4 is electrically connected to the driving node A.

The first data writing sub-circuit 31 includes the $1^{st}$ third transistor T13, the second data writing sub-circuit 32 includes the $2^{nd}$ third transistor T23, the third data writing sub-circuit 33 includes the $3^{rd}$ third transistor T33, and the fourth data writing sub-circuit 34 includes the $4^{th}$ third transistor T43.

The gate electrode of T13 is electrically connected to the scanning control terminal G1, the source electrode of T13 is electrically connected to the first data line D1, and the drain electrode of T13 is electrically connected to the $1^{st}$ first node N11.

The gate electrode of T23 is electrically connected to G1, the source electrode of T23 is electrically connected to the second data line D2, and the drain electrode of T23 is electrically connected to the $2^{nd}$ first node N21.

The gate electrode of the T33 is electrically connected to the G1, the source electrode of the T33 is electrically connected to the third data line D3, and the drain electrode of the T33 is electrically connected to the $3^{rd}$ first node N31.

The gate electrode of the T43 is electrically connected to G1, the source electrode of the T43 is electrically connected to the fourth data line D4, and the drain electrode of the T43 is electrically connected to the $4^{th}$ first node N41.

The first driving sub-circuit includes a first drive transistor T01, and the first light-emitting control sub-circuit includes the $1^{st}$ fifth transistor T15 and the $1^{st}$ sixth transistor T16.

The gate electrode of T01 is electrically connected to the driving node A, the source electrode of T01 is electrically connected to the $1^{st}$ first node N11, and the drain electrode of T01 is electrically connected to the $1^{st}$ second node N12.

The gate electrode of T15 is electrically connected to the light emitting control terminal E1, the source electrode of T15 is electrically connected to the high voltage terminal, and the drain electrode of T15 is electrically connected to N11.

The gate electrode of T16 is electrically connected to E1, the source electrode of T16 is electrically connected to N12, and the drain electrode of T16 is electrically connected to the anode of O1; the cathode of O1 is electrically connected to the low voltage terminal which is used for providing a low voltage signal V02.

The second driving sub-circuit includes a second drive transistor T02, and the second light emitting control sub-circuit includes the $2^{nd}$ fifth transistor T25 and the $2^{nd}$ sixth transistor T26.

The gate electrode of T02 is electrically connected to the driving node A, the source electrode of T02 is electrically connected to the $2^{nd}$ first node N21, and the drain electrode of T02 is electrically connected to the $2^{nd}$ second node N22.

The gate electrode of T25 is electrically connected to E1, the source electrode of T25 is electrically connected to the high voltage terminal, and the drain electrode of T25 is electrically connected to N21.

The gate electrode of T26 is electrically connected to E1, the source electrode of T26 is electrically connected to N22, and the drain electrode of T26 is electrically connected to the anode of O1.

The third driving sub-circuit includes a third drive transistor T03, and the third light-emitting control sub-circuit includes the $3^{rd}$ fifth transistor T35 and the $3^{rd}$ sixth transistor T36.

The gate electrode of the T03 is electrically connected to the driving node A, the source electrode of the T03 is electrically connected to the $3^{rd}$ first node N31, and the drain electrode of the T03 is electrically connected to the $3^{rd}$ second node N32.

The gate electrode of the T35 is electrically connected to the E1, the source electrode of the T35 is electrically connected to the high voltage terminal, and the drain electrode of the T35 is electrically connected to N31.

The gate electrode of the T36 is electrically connected to the E1, the source electrode of the T36 is electrically connected to the N32, and the drain electrode of the T36 is electrically connected to the anode of the O1.

The fourth driving sub-circuit includes a fourth drive transistor T04, and the fourth light-emission control sub-circuit includes the $4^{th}$ fifth transistor T45 and the $4^{th}$ sixth transistor T46.

The gate electrode of T04 is electrically connected to the driving node A, the source electrode of T04 is electrically connected to the $4^{th}$ first node N41, and the drain electrode of T04 is electrically connected to the $4^{th}$ second node N42.

The gate electrode of T45 is electrically connected to E1, the source electrode of T45 is electrically connected to the high voltage terminal, and the drain electrode of T45 is electrically connected to N41.

The gate of T46 is electrically connected to E1, the source of T46 is electrically connected to N32, and the drain of T46 is electrically connected to the anode of O1.

In at least one embodiment of the pixel circuit as shown in FIG. 3, all of the transistors are p-type thin film transistors, but the present disclosure is not limited thereto.

In at least one embodiment of the pixel circuit as shown in FIG. 3, the driving branches share C1, T4 and T1, and the pixel circuit employs only one compensation transistor T2, thereby enabling a reduction in the quantity of transistors used.

In at least one embodiment of the present disclosure, the data writing circuit can be electrically connected to the same data line, and is used for writing, under control of the scanning control signal provided by the scanning control terminal, the data voltage on the same data line into all the first nodes, which enables reducing the quantity of data lines used.

Optionally, when the data writing circuit is electrically connected to the same data line, the compensation circuit can be further electrically connected to at least one second node of the N second nodes other than the specific second node, and is further used for establishing a connection between the driving node and the at least one second node under control of the scanning control signal.

The pixel driving method according to embodiments of the present disclosure is applied to the above-mentioned pixel circuit, and a driving cycle includes an initialization phase, a data writing phase and a light emitting phase which are arranged in sequence: the pixel driving method includes:

in the initialization stage, a first initialization circuit writes an initial voltage into a driving node under control of a reset control signal;

in the data writing stage, a data writing circuit writes a data voltage into the $n^{th}$ first node under control of a scanning control signal: and a compensation circuit establishes a connection between the driving node and a specific second node under control of the scanning control signal;

in the light-emitting stage, the $n^{th}$ light emitting control sub-circuit establishes, under control of a light emitting control signal, a connection between a first voltage terminal and the $n^{th}$ first node and a connection between the $n^{th}$ second node and a light emitting element, and the $n^{th}$ driving sub-circuit generates, under control of the electric potential of the driving node, the $n^{th}$ driving current flowing from the $n^{th}$ first node to the $n^{th}$ second node.

Optionally, the pixel circuit can further include a second initialization circuit.

The pixel driving method can further include: in the data writing phase, the second initialization circuit writes, under control of the scanning control signal, the initial voltage into a first electrode of the light emitting element.

A display apparatus according to embodiments of the present disclosure includes the above-described pixel circuit.

The display device provided by at least one embodiment of the present disclosure can be any product or component having a display function, such as a cell phone, a tablet computer, a television, a display, a notebook computer, a digital photo frame, or a navigator.

While the foregoing is directed to optional embodiments of the present disclosure, it will be understood by those skilled in the art that various changes may be made and equivalents may be substituted for elements thereof without departing from the principles of the disclosure, and these changes and equivalents should be deemed as falling in the scope of the present disclosure.

What is claimed is:

1. A pixel circuit, comprising: an energy storage circuit, a first initialization circuit, a data writing circuit, a compensation circuit, a light emitting element and N driving branches, N being an integer greater than 1, the N driving branches share only one energy storage circuit, only one first initialization circuit, and only one compensation circuit; wherein the N driving branches comprise N first nodes and N second nodes;

a first terminal of the energy storage circuit is electrically connected to a driving node, a second terminal of the energy storage circuit is electrically connected to a first voltage terminal, and the energy storage circuit is used for storing electric energy;

the first initialization circuit is electrically connected to a reset control terminal, an initial voltage terminal and the driving node, and is used for writing, under control of a reset control signal provided by the reset control terminal, an initial voltage provided by the initial voltage terminal into the driving node;

a nth driving branch comprises a nth driving sub-circuit and a nth light emitting control sub-circuit, n being a positive integer less than or equal to N;

the nth driving sub-circuit is electrically connected to the driving node, the nth first node of the first nodes and the nth second node of the second nodes, and is used for generating, under control of an electric potential of the driving node, a nth driving current flowing from the nth first node to the nth second node;

the nth light emitting control sub-circuit is electrically connected to a light emitting control terminal, the first voltage terminal, the nth first node, the nth second node and the light emitting element, and is used for establishing, under control of a light emitting control signal provided by the light emitting control terminal, a connection between the first voltage terminal and the nth first node, and a connection between the nth second node and the light emitting element;

the compensation circuit is electrically connected to a scanning control terminal, the driving node and a specific second node of the N second nodes, and is used for establishing, under control of a scanning control signal, a connection between the driving node and the specific second node; and the data writing circuit is electrically connected to a data line, the scanning control terminal and the nth first node, and is used for writing, under control of the scanning control signal provided by the scanning control terminal, a data voltage on the data line into the nth first node;

wherein the data writing circuit comprises N data writing sub-circuits; and the nth data writing sub-circuit of the N data writing sub-circuits is electrically connected to the scanning control terminal, the nth data line and the nth first node, and is used for writing, under control of the scanning control signal, a nth data voltage on the nth data line into the nth first node.

2. The pixel circuit according to claim 1, further comprising a second initialization circuit, wherein the second initialization circuit is electrically connected to the scanning control terminal, the initial voltage terminal and a first electrode of the light emitting element, and is used for writing, under control of the scanning control signal, the initial voltage into the first electrode of the light emitting element; and a second electrode of the light emitting element is electrically connected to a second voltage terminal.

3. The pixel circuit according to claim 2, wherein the second initialization circuit comprises a first transistor; and a control electrode of the first transistor is electrically connected to the scanning control terminal, a first electrode of the first transistor is electrically connected to the initial voltage terminal, and a second electrode of the first transistor is electrically connected to the first electrode of the light emitting element.

4. The pixel circuit according to claim 1, wherein the nth data writing sub-circuit comprises a nth third transistor; and a control electrode of the nth third transistor is electrically connected to the scanning control terminal, a first electrode of the nth third transistor is electrically connected to the nth data line, and a second electrode of the nth third transistor is electrically connected to the nth first node.

5. The pixel circuit according to claim 1, wherein the compensation circuit comprises a second transistor; and a control electrode of the second transistor is electrically connected to the scanning control terminal, a first electrode of the second transistor is electrically connected to the driving node, and a second electrode of the second transistor is electrically connected to the specific second node.

6. The pixel circuit according to claim 1, wherein the data writing circuit is used for writing, under control of the scanning control signal provided by the scanning control terminal, the data voltage on the same data line into all the first nodes.

7. The pixel circuit according to claim 6, wherein the compensation circuit is further electrically connected to at least one second node of the N second nodes other than the specific second node, and is further used for establishing, under control of the scanning control signal, a connection between the driving node and the at least one second node.

8. The pixel circuit according to claim 1, wherein the energy storage circuit comprises a storage capacitor, the first initialization circuit comprises a fourth transistor, the nth driving sub-circuit comprises a nth drive transistor, and the nth light emitting control sub-circuit comprises a nth fifth transistor and a nth sixth transistor;

a first terminal of the storage capacitor is electrically connected to the driving node, and a second terminal of the storage capacitor is electrically connected to the first voltage terminal;

a control electrode of the fourth transistor is electrically connected to the reset control terminal, a first electrode of the fourth transistor is electrically connected to the initial voltage terminal, and a second electrode of the fourth transistor is electrically connected to the driving node;

a control electrode of the nth drive transistor is electrically connected to the driving node, a first electrode of the nth drive transistor is electrically connected to the nth first node, and a second electrode of the nth drive transistor is electrically connected to the nth second node;

a control electrode of the nth fifth transistor is electrically connected to the light emitting control terminal, a first electrode of the nth fifth transistor is electrically connected to the first voltage terminal, and a second electrode of the nth fifth transistor is electrically connected to the nth first node; and a control electrode of the nth sixth transistor is electrically connected to the light emitting control terminal, a first electrode of the nth sixth transistor is electrically connected to the nth second node, and a second electrode of the nth sixth transistor is electrically connected to the light emitting element.

9. A pixel driving method, applied to the pixel circuit according to claim 1, a driving cycle comprising an initialization phase, a data writing phase and a light emitting phase arranged in sequence, wherein the pixel driving method comprises:

in the initialization stage, a first initialization circuit writes an initial voltage into a driving node under control of a reset control signal;

in the data writing stage, a data writing circuit writes a data voltage into a nth first node under control of a scanning control signal, and a compensation circuit establishes a connection between the driving node and a specific second node under control of the scanning control signal; and in the light-emitting stage, a nth light emitting control sub-circuit establishes, under control of a light emitting control signal, a connection between a first voltage terminal and a nth first node, and a connection between a nth second node and a light emitting element, and a nth driving sub-circuit generates, under control of an electric potential of the driving node, a nth driving current flowing from the nth first node to the nth second node.

10. The pixel driving method according to claim 9, wherein the pixel circuit further comprises a second initialization circuit; and the pixel driving method further comprises: in the data writing phase, the second initialization circuit writes, under control of the scanning control signal, the initial voltage into a first electrode of the light emitting element.

11. A display apparatus, comprising the pixel circuit according to claim 1.

* * * * *